United States Patent
Tracy et al.

(10) Patent No.: US 7,914,918 B2
(45) Date of Patent: Mar. 29, 2011

(54) COLLAPSIBLE BATTERY HOLDER

(75) Inventors: Mark S. Tracy, Tomball, TX (US); Paul J. Doczy, Cypress, TX (US); Jonathan R. Harris, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1012 days.

(21) Appl. No.: 11/786,281

(22) Filed: Apr. 11, 2007

(65) Prior Publication Data

US 2008/0254351 A1    Oct. 16, 2008

(51) Int. Cl.
   *H01M 2/10* (2006.01)

(52) U.S. Cl. .............. 429/96; 429/99; 429/100
(58) Field of Classification Search .......... 429/123, 429/157, 158, 159, 96, 99, 100
See application file for complete search history.

(56) References Cited

U.S. PATENT DOCUMENTS 5,167,447 A * 12/1992 Gonzales ............... 362/202
7,687,197 B2 * 3/2010 Ladouceur et al. ......... 429/163

* cited by examiner

*Primary Examiner* — Patrick Ryan
*Assistant Examiner* — Julian Mercado

(57) ABSTRACT

A battery holder comprises a collapsible frame configured to receive at least one battery, the frame couplable to an electronic device to provide power from the at least one battery to the electronic device.

20 Claims, 2 Drawing Sheets

COLLAPSIBLE BATTERY HOLDER

BACKGROUND

Portable electronic devices often use rechargeable batteries, internal and/or external, that require special charging devices to recharge the batteries. The charging devices may be inconvenient to carry, an electrical outlet may not be available when the rechargeable batteries run low, and/or there may be some length of time during a charging cycle that the batteries are unable to provide power to the electronic device. Further, after extended use, the rechargeable batteries may lose the ability to hold a charge or have a significantly reduced life for providing power before needing to be recharged. Thus a user of the electronic device may be unable to power the electronic device, which is especially problematic if the electronic device is needed for an emergency situation.

BRIEF DESCRIPTION OF THE DRAWINGS

For a more complete understanding of the present application, the objects and advantages thereof, reference is now made to the following descriptions taken in conjunction with the accompanying drawings, in which.

DETAILED DESCRIPTION OF THE DRAWINGS

Figure 1:
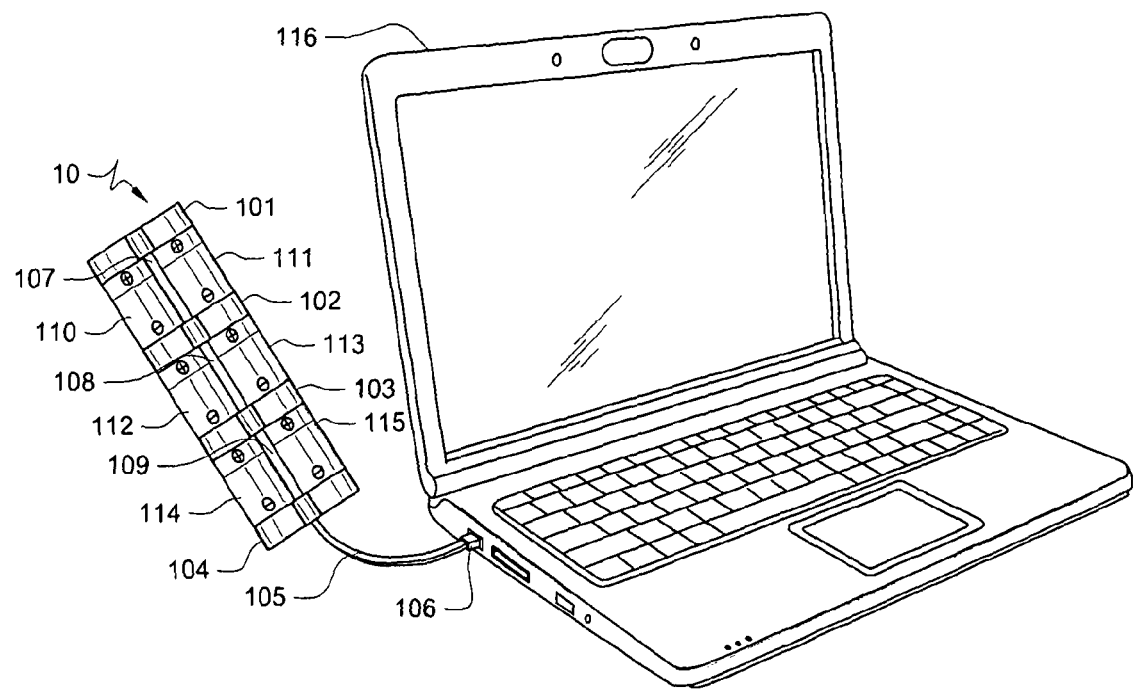
FIG. 1 is a diagram illustrating an electronic device in which an embodiment of a collapsible battery holder is used to advantage.

FIG. 1 is a diagram illustrating an embodiment of a collapsible battery holder 10 used in connection with a portable electronic device 116. In the embodiment illustrated in FIG. 1, battery holder 10 is configured to hold batteries 110-115 for providing electrical power to portable electronic device 116. Battery holder 10 is configured to collapse to a reduced size for compact storage when at least some of batteries 110-115 are removed from battery holder 10. In the embodiment illustrated in FIG. 1, portable electronic device 116 comprises a notebook computer, although it should be understood that portable electronic device 116 may comprise other types of electronic devices configured to use battery power, such as an audio device, a video device, a cell phone, a gaming device, a personal digital assistant (PDA), and a measurement device. In FIG. 1, battery holder 10 is illustrated holding six D-size batteries 110-115, although battery holder 10 may be configured to hold a greater or lesser quantity of batteries. Further, battery holder 10 may be configured to hold other sizes of batteries such as, but not limited to, AAA, AA, C, and 9-Volt batteries. Batteries 110-115 may comprise any type of battery such as, but not limited to, zinc-carbon, alkaline, and nickel-cadmium.

Figure 2A:
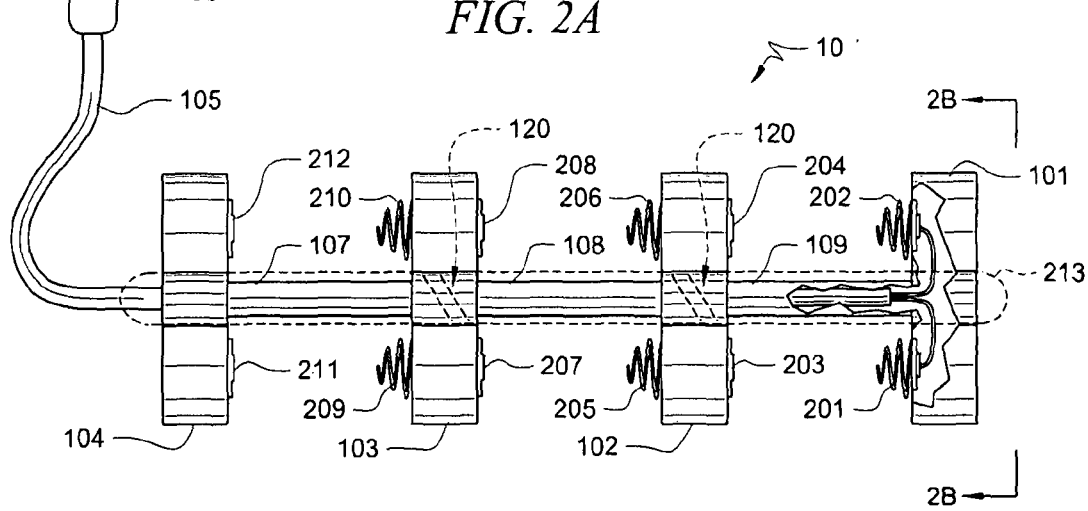
FIG. 2A is a diagram illustrating a top view of the collapsible battery holder of FIG. 1.
Figure 2B:
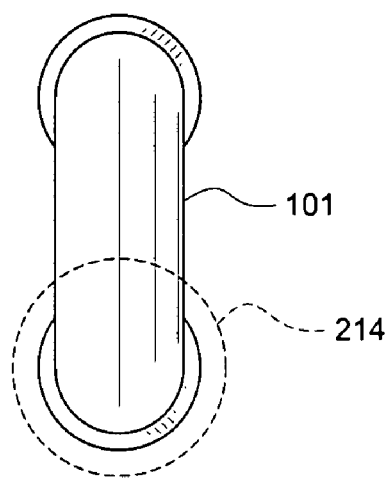
FIG. 2B is a diagram illustrating a side view of the collapsible battery holder of FIG. 2A.

FIG. 2A is a diagram illustrating a top view of battery holder 10 of FIG. 1 shown in an extended state, and FIG. 2B is a diagram illustrating a side view of battery holder 10 of FIG. 2A. Referring to FIG. 2A, battery holder 10 is configured having four battery caps 101-104 disposed on a frame 213 having three collapsible members 107-109. However, it should be understood that a greater or lesser quantity of battery caps and collapsible members may be used. In the embodiment illustrated on FIGS. 2A and 2B, battery holder 10 is configured to hold batteries 110-115 in adjacent pairs (FIG. 1) such that batteries 110 and 111 are disposed between battery caps 101 and 102, batteries 112 and 113 are disposed between battery caps 102 and 103, and batteries 114 and 115 are disposed between battery caps 103 and 104. In the embodiment illustrated in FIGS. 2A and 2B, battery holder 10 comprises a conductor 105 coupled to a power connector 106. Connector 106 is couplable to electronic device 116 (FIG. 1) to enable power from batteries 110-115 to be provided to electronic device 116.

In the embodiment illustrated in FIGS. 2A and 2B, collapsible members 107-109 are configured to extend and retract relative to each other in a telescopic manner. For example, in some embodiments, member 109 is configured to slide into an interior area of member 108, and member 108 configured to slide into an interior area of member 107. However, it should be understood that other methods of collapsing frame 213 may be used. For example, in some embodiments, collapsible members 107-109 may be configured from a flexible material to facilitate extension and retraction of battery caps 101-104 relative to each other. In some embodiments, members 107-109 are configured having a length corresponding to a particular size of battery to be used with battery holder 10 such that extending members 107-109 relative to each other locates members 107-109 in proper positions to receive batteries. However, it should be understood that in some embodiments, a locking mechanism 120 may be used to locate members 107-109 in a particular position relative to each other (e.g., in either an extended or non-extended position). For example, in some embodiments, locking mechanism 120 is configured as a twist-lock mechanism disposed on one or more members 107-109 to secure members 107-109 in a desired location. However, it should be understood that other methods and/or devices may be used such as, but not limited to, detents/recesses, spring-biased pins, etc. Thus, in some embodiments, locking mechanism 120 enables members 107-109 to be located in particular positions relative to each other to facilitate a single model or configuration of battery holder 10 to receive different sizes of batteries.

In the embodiment illustrated in FIG. 2A, battery cap 101 comprises battery terminals 201 and 202 configured to electrically couple to an end of batteries 110 and 111 (FIG. 1). Battery cap 102 comprises battery terminals 203 and 204 configured to electrically couple to an end of batteries 110 and 111 (FIG. 1) opposite battery terminals 201 and 202, respectively. Battery cap 102 also comprises battery terminals 205 and 206 disposed on a side of battery cap 102 opposite battery terminals 203 and 204 and configured to electrically couple to an end of batteries 112 and 113 (FIG. 1), respectively. Battery cap 103 comprises battery terminals 207 and 208 configured to electrically couple to an end of batteries 112 and 113 (FIG. 1) opposite battery terminals 205 and 206, respectively. Battery cap 103 also comprises battery terminals 209 and 210 disposed on a side of battery cap 103 opposite battery terminals 207 and 208 and configured to electrically couple to an end of batteries 114 and 115 (FIG. 1), respectively. Battery cap 104 comprises battery terminals 211 and 212 configured to electrically couple to an end of batteries 114 and 115 (FIG. 1) opposite battery terminals 209 and 210, respectively. In some embodiments, battery terminals 201, 202, 205, 206, 209 and 210 comprise spring-loaded contacts for providing a compressive force on batteries 110-115 to ensure electrical coupling between battery batteries 110-115 and respective battery terminals 203, 204, 207, 208, 211 and 212. In the embodiment illustrated in FIG. 2A, battery terminals 201-212 are configured to position each of batteries 110-115 in the same direction (i.e., the positive terminals of batteries 110-

115 each facing the same direction). However, it should be understood that battery holder 10 may be otherwise configured.

In the embodiment illustrated in FIG. 2A, at least a portion of conductor 105 extends through frame 213 (e.g., to battery terminals 201 and 202) to couple power connector 106 to both positive and negative terminals of batteries 110-115 via battery terminals 201-212. At least a portion of conductor 105 may comprise a flexible conduit or cable disposed in and extending through frame 213. In some embodiments, frame 213 may be conductively configured to electrically couple to conductor 105 to enable coupling to both positive and negative terminals of batteries 110-115. It should be understood, however, that alternative orientations may be used, for example, batteries 110, 112, and 114 having their negative terminal facing battery cap 104 and batteries 111, 113 and 115 having their positive terminal facing battery cap 104.

Referring to FIG. 2B, battery cap 101 is illustrated as comprising a rounded section 214 to conform to a size and/or shape of a particular battery to which battery holder 10 is configured to receive (e.g., the size and shape of a D-size battery). Battery caps 102, 103 and 104 may be similarly configured. However, it should be understood that battery caps 101-104 may comprise a different size and/or shape to accommodate a different style or size of battery (e.g., a smaller diameter rounded section 214 to conform to the size/shape of a AAA battery, or rectangular to accommodate a 9-Volt battery).

Figure 3:
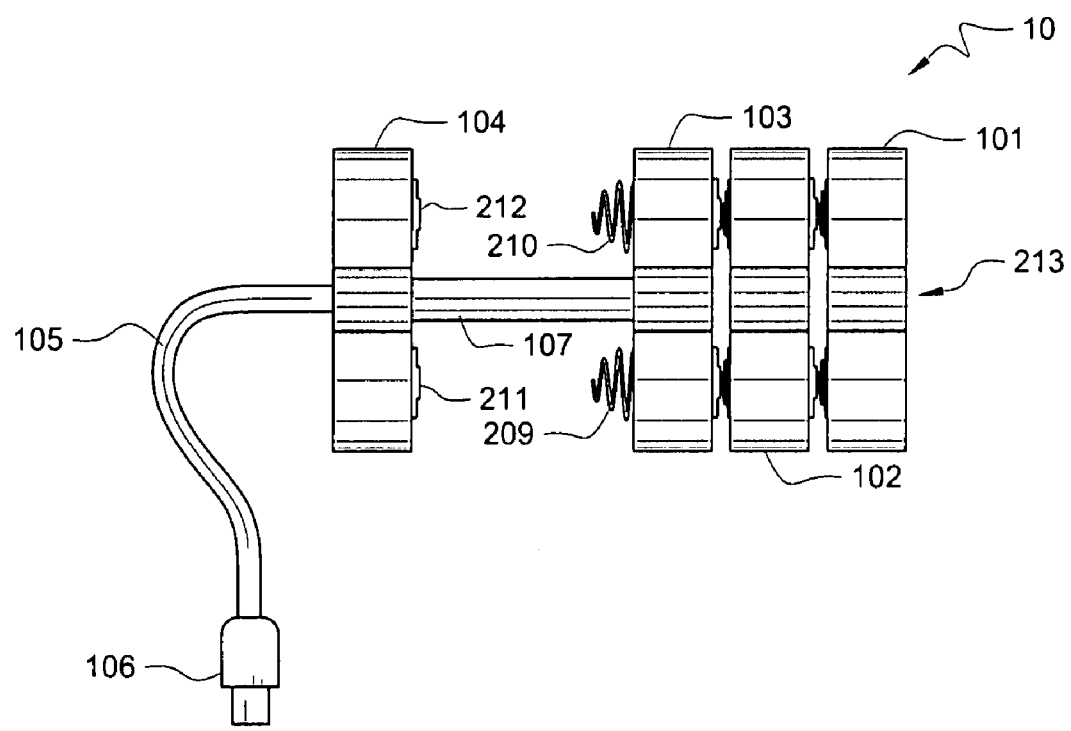
FIG. 3 is a diagram illustrating the collapsible battery holder of FIGS. 1, 2A and 2B in a collapsed state.

FIG. 3 is a diagram illustrating battery holder 10 of FIGS. 1, 2A and 2B in a partially collapsed state. In FIG. 3, frame 213 has been at least partially collapsed causing battery cap 101 to be disposed adjacent and/or in contact with battery cap 102, and battery cap 102 disposed adjacent and/or in contact with battery cap 103. It should be understood that battery holder 10 may be further collapsed by causing collapsing movement of frame 213 to cause battery cap 104 to be disposed adjacent and/or against battery cap 103. It should be understood that different embodiments of battery holder 10 may be configured to collapse to different lengths depending on, for example, the configuration of conductor 105, the configuration of frame 213 and/or the configuration of battery caps 101-104.

Thus, embodiments of battery holder 10 enable battery holder 10 to be stored in a relative compact state (e.g., where frame 213 of battery holder 10 is collapsed to shorten an overall length of battery holder 10). Battery holder 10 is easily expanded to facilitate placement of batteries 110-115 in battery holder 10 and coupling of battery holder 10 to electronic device 116.

What is claimed is:

1. A battery holder, comprising:
a collapsible frame that receives at least one battery between two ends of the frame and that collapses to a reduced size of the frame when the at least one battery is removed from the frame, the frame couplable to an electronic device to provide power from the at least one battery to the electronic device.

2. The battery holder of claim 1, wherein the frame comprises a plurality of battery caps configured to be electrically coupled to the at least one battery.

3. The battery holder of claim 1, wherein the frame comprises a plurality of members telescopically movable relative to each other.

4. The battery holder of claim 1, wherein the frame comprises a plurality of battery caps movable relative to each other.

5. The battery holder of claim 1, further comprising a plurality of battery caps each having at least one battery terminal couplable to the at least one battery.

6. The battery holder of claim 1, wherein the frame comprises a conductor electrically coupling the at least one battery to a connector of the battery holder.

7. The battery holder of claim 1, further comprising a plurality of battery caps configured to apply a compressive force to the at least one battery.

8. A method for manufacturing a battery holder, comprising:
providing a collapsible frame configured to receive at least one battery between two ends of the frame;
configuring a size of the frame to allow removal of the at least one battery in order to move the two ends toward each other and collapse the frame; and
configuring the frame to be couplable to an electronic device to provide power from the at least one battery to the electronic device.

9. The method of claim 8, further comprising configuring the frame to have a plurality of battery caps electrically couplable to the at least one battery.

10. The method of claim 8, further comprising configuring the frame having a plurality of members telescopically movable relative to each other.

11. The method of claim 8, further comprising configuring the frame having a plurality of battery caps movable relative to each other.

12. The method of claim 8, further comprising providing a plurality of battery caps each having at least one battery terminal couplable to the at least one battery.

13. The method of claim 8, further comprising providing a conductor electrically coupling the at least one battery to a connector of the battery holder.

14. The method of claim 8, further comprising providing a plurality of battery caps configured to apply a compressive force to the at least one battery.

15. A battery holder, comprising:
a frame; and
two battery caps disposed on opposite ends of the frame, wherein the frame moves from an extended position in which a battery is disposed between the two battery caps and to a collapsed position in which the battery is removed from the frame so the battery caps move closer together to collapse the frame to a reduced size.

16. The battery holder of claim 15, wherein the frame includes plural collapsible members that extend in a telescopic manner to lengthen the frame to receive the battery and retract in the telescopic manner to shorten the frame.

17. The battery holder of claim 15, further comprising plural collapsible members disposed along the frame, and a locking mechanism that locks the plural collapsible members to different positions in order to adjust a length of the frame so the frame can receive batteries having different sizes.

18. A battery holder, comprising:
a frame;
a power connector having one end coupled to the frame and a second end couplable to an electronic device; and
a plurality of battery caps disposed at opposite ends of the frame and electrically coupled to at least one battery disposed between the plurality of battery caps and the ends to facilitate transfer of power from the at least one battery to the electronic device, the plurality of battery caps move from a collapsed position in which the at least one battery is removed from the frame to an extended position that receives the at least one battery.

19. The battery holder of claim 18, wherein the plurality of battery caps are configured to apply a compressive force to the at least one battery.

20. The battery holder of claim 18, wherein the frame comprises a plurality of telescopically movable members, and the plurality of battery caps are coupled to the plurality of telescopically movable members.

\* \* \* \* \*